No. 686,710. Patented Nov. 19, 1901.
L. J. BUREAN.
APPARATUS FOR MAKING SALT.
(Application filed Jan. 26, 1901.)
(No Model.) 2 Sheets—Sheet 1.
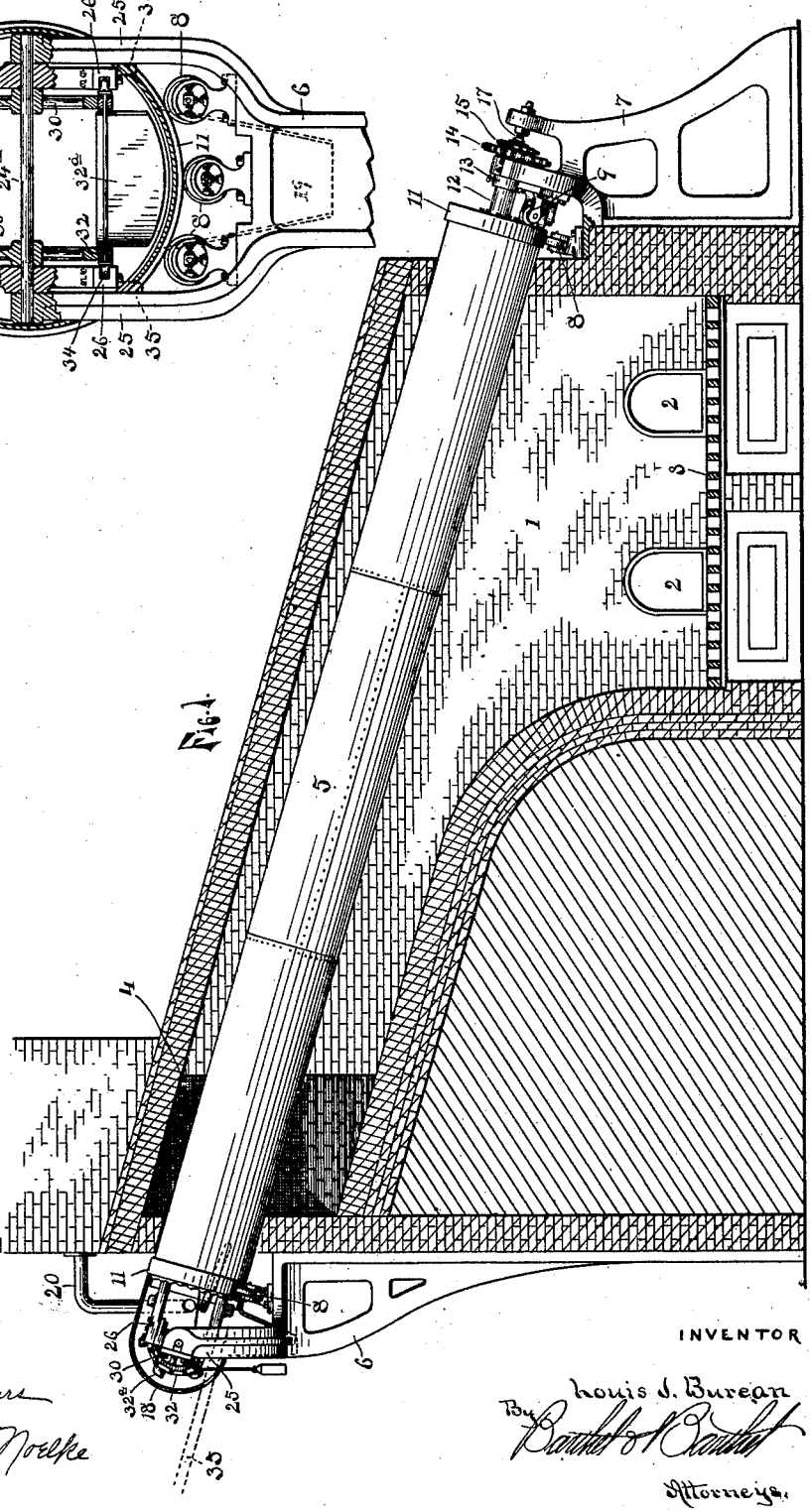

No. 686,710. Patented Nov. 19, 1901.
L. J. BUREAN.
APPARATUS FOR MAKING SALT.
(Application filed Jan. 26, 1901.)
(No Model.) 2 Sheets—Sheet 2.
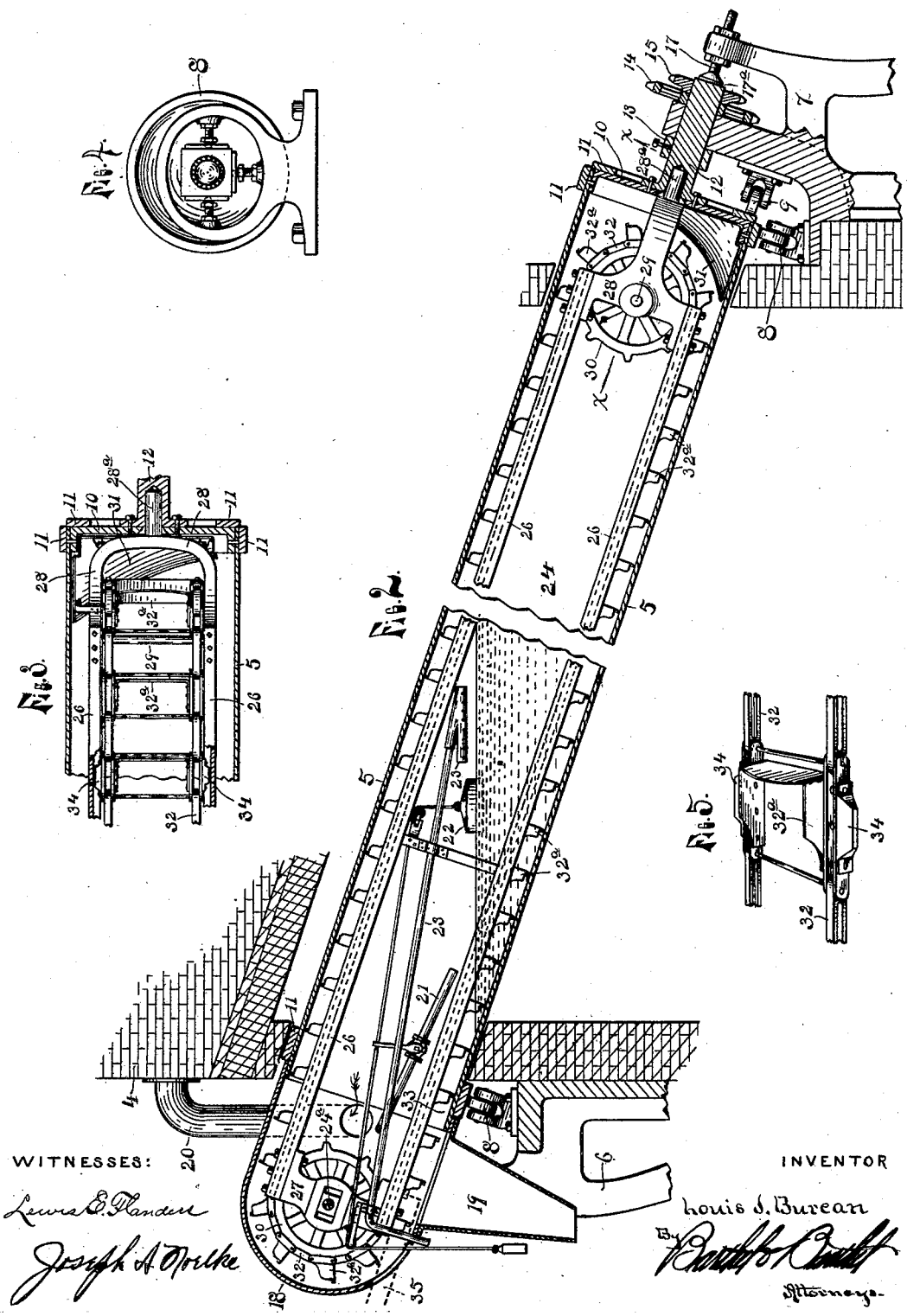
WITNESSES:
INVENTOR
Louis J. Burean

UNITED STATES PATENT OFFICE.

LOUIS J. BUREAN, OF DELRAY, MICHIGAN.

APPARATUS FOR MAKING SALT.

SPECIFICATION forming part of Letters Patent No. 686,710, dated November 19, 1901.

Application filed January 26, 1901. Serial No. 44,771. (No model.)

*To all whom it may concern:*

Be it known that I, LOUIS J. BUREAN, a citizen of the United States of America, residing at Delray, in the county of Wayne and State of Michigan, have invented certain new and useful Improvements in Apparatus for Making Salt, of which the following is a specification, reference being had therein to the accompanying drawings.

This invention has particular reference to an apparatus for making salt, more particularly designed for carrying on its continuous manufacture on an extensive scale; and to this end the invention consists in the employment of an inclined cylindrical vessel adapted to slowly revolve within the furnace-chamber, whereby the direct application of the heat is obtained to convert the brine contained within the vessel into salt without danger of burning; and the invention further consists in the employment of means for removing the salt and keeping the cylinder clean while running and in the means whereby the whole of the interior mechanism may be removed without dismounting the cylinder for purpose of repair.

The invention consists, further, in the peculiar construction, arrangement, and combination of parts, all as more fully hereinafter described, and shown in the accompanying drawings, in which—

Figure 1 is a vertical central section through a furnace, showing the inclined cylindrical vessel in elevation, the hood being broken away to show the interior mechanism. Fig. 2 is a longitudinal section through the cylinder, showing the conveyer and operating mechanism in elevation. Fig. 3 is a horizontal section on line $x$ $x$, Fig. 2, the conveyer mechanism being shown in elevation. Fig. 4 is a side elevation of one of the antifriction-rolls, showing the construction of the adjustable box. Fig. 5 is a perspective view of a section of the conveyer-chain, showing one of the scrapers. Fig. 6 is a sectional elevation of the upper end of the cylinder and supporting mechanism.

As shown in the drawings, 1 is the furnace, provided with doors 2, grates 3, and chimney 4, all of usual construction.

5 is an inclined cylindrical vessel, preferably made of boiler-iron and of a length to extend across the entire furnace-chamber and be supported by the walls thereof and the supporting-brackets 6 and 7, carrying the antifriction-rollers 8, upon which said cylinder is revolubly mounted, and 9 represents antifriction-rollers carried by the support 7, adapted to press against the head 10 of the cylinder and take up the end thrust, suitable tracks 11 being provided for all of said rollers.

12 is a trunnion formed on the head 10, mounted in suitable bearings on the support 7, and 13 is the usual thrust-collar, while 14 15 are sprocket-wheels of different size for driving the cylindrical vessel at varying speeds, as desired.

17 is an additional adjustable thrust-bearing acting upon the end of the trunnion, a suitable plate 17ª being interposed between the same.

18 is a stationary hood slipped on over the upper end of the revolving cylindrical vessel 5 and is provided with a suitable discharge-spout 19 and pipe 20, communicating with the chimney.

21 is the inlet-pipe for the brine, which is maintained at a certain height within the vessel by means of an indicating-float 22, and 23 is a pipe for admitting cold air into the cylinder and discharging the same at or near the surface of the brine, and by reason of the draft created by the pipe 20, communicating with the chimney, all steam and moisture will be carried off.

The antifriction-rollers are all provided with roller-bearings and adjustable boxes, so that should the drum become warped by reason of the heat or the expansion and contraction of the metals take place the rolls can be adjusted so that each will do its work.

24 is an inclined conveyer removably secured within the revolving cylinder and does not rotate therewith, but is held in fixed position by means of the shaft 24ª being mounted in the arms 25 of the support 6. The conveyer is composed of the two sets of grooved guide-rails 26, connected together at their opposite ends by the member 27 28, in which the transverse shafts 24ª 29, carrying the sprocket-wheels 30, are mounted. The connecting member 28 is made U-shaped in plan view and is provided with a trunnion-bearing 28ª, adapted to support the lower end of the conveyer within the cylinder, as shown in Figs. 2 and 3, while 31 is a moldboard secured to said member and adapted to turn the salt contained within the lower end of the cylinder into the buckets or scrapers as said cylinder slowly revolves.

32 is an endless sprocket-chain passing over the sprocket-wheels 30 and provided at intervals apart with bottomless buckets or scrapers 32ª, adapted to scrape the salt up to the top of the cylinder and to the discharge-spout, the inclined portion 33 acting as a draining-board before the salt is discharged.

34 represents guide-lugs secured to the side of the chain and adapted to travel in the grooves formed in the guide-rails, so that the scrapers will just clear the bottom of the cylinder, suitable means being provided, as shown, for taking up the slack in the chain.

35 represents ways upon which the guide-rails 26 are adapted to slide, should it be desired at any time to get at the interior parts for repairs. For this purpose all that is required is to remove the detachable hood and by means of a tackle draw the entire conveyer from within the cylinder, the trunnion-bearing 28ª being so arranged that it is self-entering in being replaced, and should the salt become caked while the conveyer is removed all that is required is to let the conveyer slide into the cylinder until it sticks and then start the cylinder to revolving, when the moldboard 31 will loosen the salt and feed it to the scrapers until the trunnion has found its bearing. It will also be noticed that the major portion of the weight of the conveyer is taken up by the arms 25, as the shoulder of the trunnion-bearing 28ª does not seat against the head of the drum, but is supported a slight distance therefrom, so as to eliminate all possible friction, and as the cylinders are made from forty to fifty feet long and four to five feet in diameter their weight is enormous when filled with brine, and the element of friction forms a great factor.

My apparatus is comparatively cheap and simple and has the capacity of several salt grainers or evaporators of ordinary construction, by reason of the direct application of heat, without danger of caking or burning, which is so troublesome where the heat is applied in one spot all the time. Further, I am enabled to produce a finer quality of salt, as by varying the speed of the cylinder I can get any degree of heat and in combination with the variable speed of the scrapers any degree of agitation necessary to produce the largest quantity of salt of any degree of fineness, and by reason of the scrapers and the moldboard operating at right angles to the cylinder there are no dead ends and the cylinder is always perfectly clean, thus not requiring the necessity of shutting down the plant in order to scrape the incrustation from the evaporators or pans, as is such a common occurrence and entails much loss of valuable time.

What I claim as my invention is—

1. In an apparatus of the character described, the combination with a furnace-chamber, of an inclined cylindrical vessel open at its upper end and closed at its lower end, extending across said chamber in direct heating contact with the fire and revolubly supported at its opposite ends, a trunnion carried by the lower end of said vessel and means for rotating said vessel through the medium of said trunnion, substantially as described.

2. In an apparatus for making salt, the combination with a furnace, of an inclined cylindrical vessel extending across the furnace-chamber and rotatably mounted in bearings, said vessel being open at its upper end and closed at its lower end, a conveyer removably secured within said vessel, operating at right angles to the line of rotation of the vessel and means for imparting movement to said vessel and conveyer.

3. In an apparatus for making salt, the combination with a furnace, of an inclined cylindrical vessel in said furnace adapted to contain the brine, antifriction-rollers adapted to revolubly support the opposite ends of said vessel, a trunnion carried by the lower end of said vessel, mounted in bearings in the supporting-frame and means for imparting motion to said vessel through the medium of said trunnion, a conveyer having its lower end pivotally mounted in said trunnion and an adjustable stop carried by the supporting-frame adapted to take the end thrust from said trunnion.

4. In an apparatus for making salt, &c., the combination with a furnace, of an inclined vessel having a detachable hood at one end, and a closed head at its lower end carrying a trunnion journaled in the supporting-bracket, antifriction-rolls adapted to revolubly support said cylinder, and a secured set of antifriction-rolls acting against the head of said cylinder to take up the end thrust therefrom.

5. In an apparatus for making salt, the combination with a furnace, of an inclined cylindrical vessel revolubly mounted in said furnace and adapted to contain the brine, a conveyer stationarily mounted within the cylinder, but removable therefrom, and a moldboard carried by the lower end of the conveyer to feed the material to be conveyed to the conveyer as the cylinder revolves.

6. In an apparatus for making salt, the combination with a furnace-chamber, of an inclined cylindrical vessel extending across said chamber, in direct heating contact with the fire, revolubly mounted in bearings in the opposite ends thereof and adapted to contain the brine, a supply-pipe and a float for regulating the height of the brine, and means for removing the salt therefrom while revolving.

7. In an apparatus for making salt, the combination with a furnace-chamber, of an inclined cylindrical vessel extending across said chamber, revolubly mounted in bearings in the opposite ends thereof and adapted to contain the brine, a conveyer comprising a series of scrapers traveling in guide-rails removably secured within the vessel, and ways forming a continuation of said rails upon which said guide-rails are adapted to slide in removing the conveyer.

8. In an apparatus for making salt, the combination with a furnace-chamber, of an inclined cylindrical vessel extending across said chamber, revolubly mounted in bearings in the opposite ends thereof and adapted to contain the brine, a hood removably secured over the upper end of said cylinder, an exhaust-pipe to draw off the moisture therefrom, and an air-inlet pipe communicating with the atmosphere and adapted to discharge cold air at or near the surface of the brine.

9. In an apparatus for making salt, the combination with a furnace, of an inclined vessel revolubly supported within the furnace in direct heating contact, of a conveyer stationarily secured within the vessel but removable therefrom, comprising the guide-rails 26, sprockets 30 and chain 32, carrying the scrapers 32$^a$, and the ways 35, upon which the conveyer is adapted to slide when drawn out from the vessel.

10. In an apparatus for making salt, the combination with a furnace 1, vessel 5, mounted on the antifriction-rollers 8, and provided with the hood 18, and conveyer 24 within the vessel, of the trunnion 12, secured to the head 10, and mounted in the bracket 7, carrying the drive-sprocket, all substantially as and for the purpose described.

11. In an apparatus for the purpose described, the combination with the furnace-chamber, of an inclined cylindrical vessel extending across the same, the brackets 6 and 7 carrying the rollers 8, revolubly supporting said vessel, the rollers 9 acting against the head 10 of the vessel, the trunnion 12 carried by the head, the conveyer 24 carrying the moldboard 31, and having its lower end pivotally mounted in said head, all intended to operate substantially as and for the purpose described.

12. In an apparatus for making salt, the combination with a furnace, of an inclined cylindrical vessel extending across the furnace and rotatably mounted in bearings in front and rear thereof, a conveyer removably supported within the cylinder, comprising the guide-rails 26, connecting member 27, and U-shaped connecting member 28 carrying the trunnion 28$^a$, and moldboard 31, the sprockets 30 journaled in said members and the endless chain 32 carrying the scrapers 32$^a$.

In testimony whereof I affix my signature in presence of two witnesses.

LOUIS J. BUREAN.

Witnesses:
GEORGE KUNZE,
OTTO F. BARTHEL.